United States Patent
Hoelsch et al.

(10) Patent No.: US 11,870,675 B1
(45) Date of Patent: Jan. 9, 2024

(54) SYSTEM TO TEST REVERSE PROXY CONFIGURATIONS

(71) Applicant: SAP SE, Walldorf (DE)

(72) Inventors: Juergen Hoelsch, Berlin (DE); Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/328,035

(22) Filed: Jun. 2, 2023

(51) Int. Cl.
*H04L 29/08* (2006.01)
*H04L 29/06* (2006.01)
*H04L 43/50* (2022.01)
*H04L 67/56* (2022.01)
*H04L 43/08* (2022.01)
*H04L 12/46* (2006.01)

(52) U.S. Cl.
CPC .............. *H04L 43/50* (2013.01); *H04L 43/08* (2013.01); *H04L 67/56* (2022.05)

(58) Field of Classification Search
CPC ......... H04L 43/50; H04L 67/56; H04L 43/08; H04L 12/46; H04L 29/08; H04L 29/06
USPC ....................................................... 709/224
See application file for complete search history.

(56) References Cited

U.S. PATENT DOCUMENTS

2017/0289269 A1\* 10/2017 Bell ........................ G06F 16/00
2019/0306267 A1\* 10/2019 Lee ..................... H04L 12/4633

\* cited by examiner

*Primary Examiner* — Jude Jean Gilles
(74) *Attorney, Agent, or Firm* — Buckley, Maschoff & Talwalkar LLC

(57) ABSTRACT

Systems and methods include transmission of a first request for a first connection to a first service, usage of a first reverse proxy process to manage a first connection based on a first service configuration, change, in response to the first request, the first service configuration to a second service configuration, instantiate, in response to the change to the second service configuration, a second reverse proxy process based on the second service configuration, transmit, in response to the change to the second service configuration, a second request for a second connection to the first service an use of the second reverse proxy process to manage the second connection in response to the second request, wherein the first reverse proxy process and the second reverse proxy process execute simultaneously.

18 Claims, 8 Drawing Sheets

SYSTEM TO TEST REVERSE PROXY CONFIGURATIONS

BACKGROUND

Modern organizations often utilize a system landscape consisting of distributed computing systems providing various computing services. For example, an organization may deploy services within computing systems located in on-premise data centers (which themselves may be located in disparate geographic locations) and within data centers provided by one or more platform-as-a-service (PaaS) providers. Any number of the computing systems may comprise cloud-based systems (e.g., providing services using scalable-on-demand virtual machines).

A user connects to a service running in a cloud environment, such as a database service, via a corresponding Uniform Resource Locator. A reverse proxy that is specific to the cloud environment routes the connection to the service and maintains the connection. The performance of the reverse proxy is therefore critical to the availability and stability of the service.

A reverse proxy may be required to handle thousands of simultaneous connections. Moreover, a reverse copy may execute many instances of a process to handle its connections, further taxing its available resources. For example, users open connections to a service through a process spawned by a reverse proxy. If the service changes (e.g., creation of a new instance, change in an IP allowlist), then any new incoming connections are handled by a newly-spawned process which is aware of the changes. In the meantime, the prior process continues to execute to handle its existing connections. The number of simultaneously-executed processes increases over time, thereby increasing resource utilization of the reverse proxy. The increased utilization is particularly prevalent in the case of database services since, unlike stateless services, the connections established by users of such services are often long-running.

To meet these demands, a reverse proxy is carefully configured in view of factors such as the load of the cloud environment, the nature of the requests (e.g., long-running connections vs. short-running connections), etc. Configuration options include but are not limited to the number of processes and threads per reverse proxy, backend reload intervals, health check intervals, memory and CPU limits, and timeouts. Due to the critical nature of reverse proxies, a reverse proxy configuration should be tested prior to deployment in a productive landscape.

Testing reverse proxy configurations is currently difficult. A new configuration should not be tested in a productive system due to the criticality issues noted above. However, recreating the above-described load characteristics would require extensive computing resources and set-up time. A system is needed to cost-effectively test reverse proxy configurations under high loads.

DETAILED DESCRIPTION

The following description is provided to enable any person in the art to make and use the described embodiments. Various modifications, however, will remain readily-apparent to those in the art.

Some embodiments operate to cost-effectively reproduce productive loads on a reverse proxy. Embodiments may thereby provide efficient testing of different reverse proxy configurations.

Generally, one or more backend services are instantiated and a reverse proxy executes a process to handle one or more connections thereto. The backend services may comprise dummy TCP endpoints which may represent databases but which require far fewer computing resources. A backend service configuration is then automatically changed and a new connection is requested.

The change to the backend service configuration triggers the reverse proxy to spawn a new process using the changed configuration. In the meantime, the connections handled by the prior process are maintained so that the prior process does not terminate. The foregoing steps are repeated to cause instantiation of additional simultaneously-executing processes which correspondingly increase the load on the reverse proxy. The reverse proxy may be monitored during the above-described operation in order to evaluate the suitability of its own configuration for its intended purpose.

Figure 1:
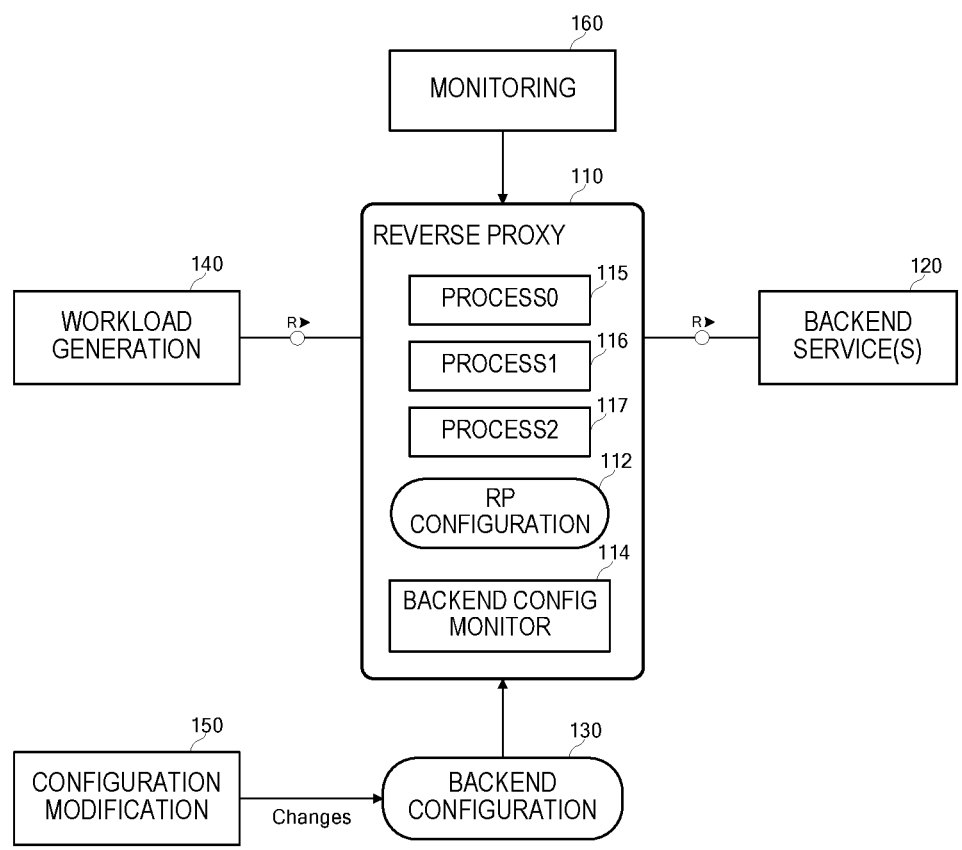
FIG. 1 illustrates testing of a reverse proxy configuration according to some embodiments.

FIG. 1 illustrates testing of a reverse proxy according to some embodiments. Each illustrated component of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Reverse proxy 110 may comprise any number of hardware and software components which provide reverse proxy functionality. Generally, a reverse proxy forwards client requests to back-end applications. In doing so, a reverse proxy may provide increased scalability, performance, resilience and security. Reverse proxy 110 may, for example, comprise an instance of HAProxy, which is open-source software providing a high availability load balancer and reverse proxy for TCP- and HTTP-based applications that spreads incoming requests across multiple backend services.

Reverse proxy 110 operates according to configuration parameters, settings, etc. specified in reverse proxy configuration 112. Reverse proxy configuration 112 may specify, for example, a maximum number of processes and threads, backend reload intervals, health check intervals, memory and CPU limits, and timeout values. The FIG. 1 system may operate to test reverse proxy configuration 112.

Backend service(s) 120 may comprise one or more services to which reverse proxy 110 may route incoming connections. Each of backend service(s) 120 may be implemented in a manner which consumes few resources such that, for example, hundreds of backend service(s) 120 may satisfactorily execute on a single virtual machine. In some examples, service(s) 120 comprise TCP endpoints which simply accept an incoming TCP connection and respond with an acknowledgement.

Backend configuration 130 includes metadata used by reverse proxy 110 to connect to backend service(s) 120. The metadata may identify backend service(s) 120, information needed to connect to each of backend service(s) 120, and other networking-related information. The metadata of backend configuration 130 may change during operation of reverse proxy 110, for example to add or remove a backend service 120 or to update an IP allowlist.

Changes to backend configuration 130 are detected by backend configuration monitor 114 of reverse proxy 110. In response to detection of a change, reverse proxy 110 spawns a new process which uses the changed backend service configuration 130 to handle subsequently-received requests. In the meantime, any connections being handled by prior processes continue to be handled by those processes. Accordingly, in the example of FIG. 1, process0 115 handles one or more ongoing connections using one version of backend configuration 130, process1 116 handles one or more later-established ongoing connections using another version of backend configuration 130, and process2 117 handles one or more even later-established ongoing connections using yet another version of backend configuration 130.

Workload generation component 140 may request connections to backend service(s) 120. Workload generation component 140 is therefore aware of at least one of backend service(s) 120 and possesses information (e.g., a corresponding URL) needed to request a connection thereto. As will be described below, workload generation component 140 is able to establish and maintain multiple simultaneous long-running connections with backend service(s) 120.

Configuration modification component 150 operates to change backend configuration 130 as mentioned above. Such changes may include, but are not limited to, changes to an IP allowlist associated with one or more of backend service(s) 120, addition of a new backend service 120, and deletion of a backend service 120. The changes may occur periodically and, as described below, may be synchronized with the transmission of connection requests to reverse proxy 110 by workload generation component 140.

Monitoring component 160 may comprise any suitable monitoring system to determine performance metrics associated with reverse proxy 110. Such metrics may facilitate an evaluation of configuration 112. Performance metrics according to some embodiments may include number of simultaneous connections, number of simultaneous processes, CPU consumption, and memory consumption.

Monitoring component 160 may query reverse proxy 110 for selected metric-related data, may subscribe to the selected metric-related data, may receive metric-related data pushed from reverse proxy 110, or may acquire the metric-related therefrom using any suitable protocol. In some embodiments, monitoring component 160 executes an application for recording real-time metric data in a time-series database using an HTTP pull model.

Figure 2:
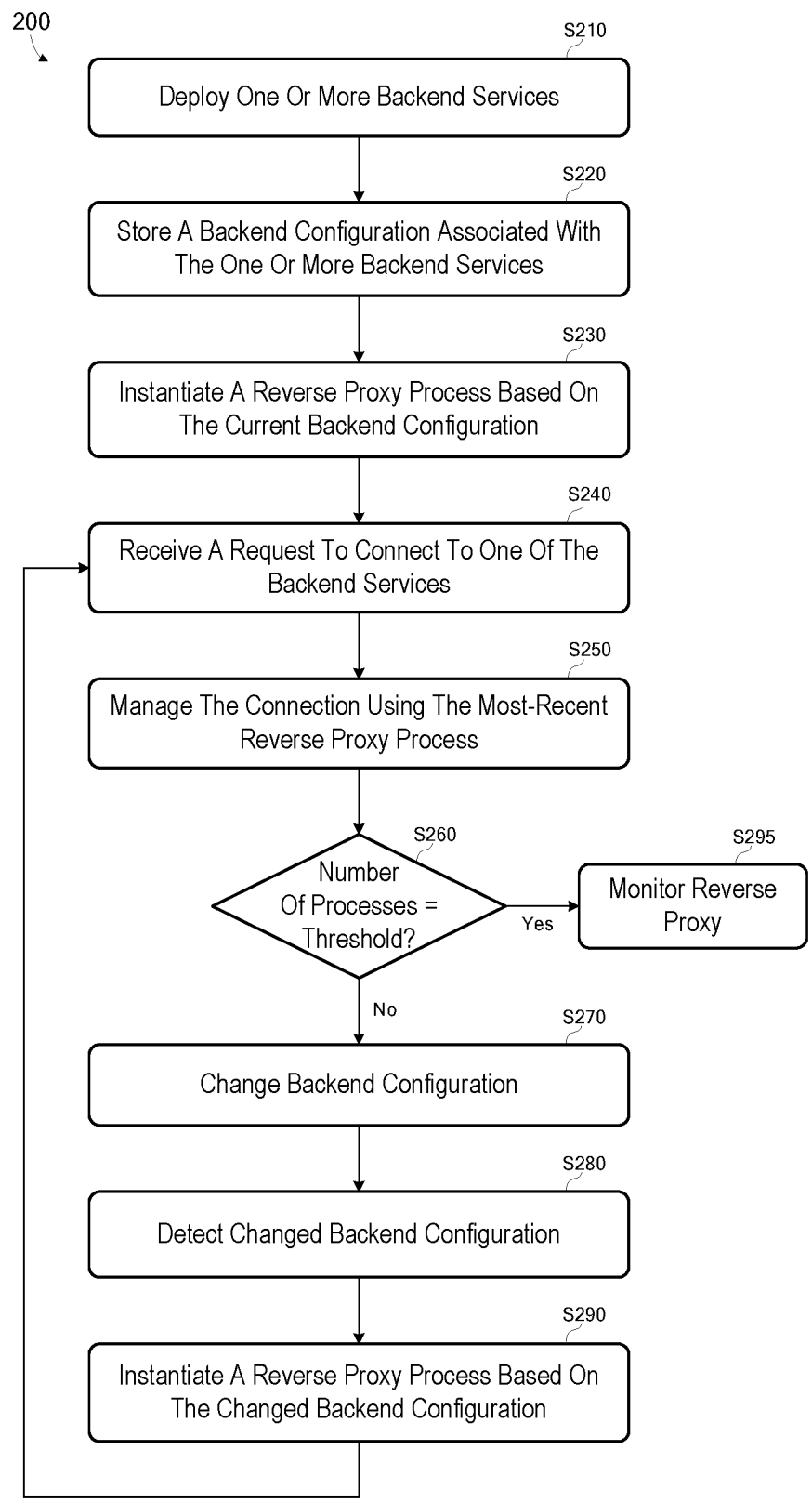
FIG. 2 is a flow diagram of a process to test a reverse proxy configuration according to some embodiments.

FIG. 2 comprises a flow diagram of process 200 to test a reverse proxy configuration according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Prior to process 200, a reverse proxy is instantiated using a test configuration in a test landscape. The reverse proxy may comprise a software application executing on a virtual machine, for example. Any suitable reverse proxy that is or becomes known may be used in some embodiments. Several replicas of the reverse proxy may be deployed in the test landscape, particularly in a case that the test configuration is being tested for use in a productive landscape including such replicas.

Initially, at S210, one or more backend services are deployed. The backend services may comprise one or more services to which the reverse proxy may route incoming connections. Each of the one or more backend services may be implemented in a "lightweight" manner intended to consume minimal resources. In some examples, the one or more backend services comprise TCP endpoints.

A backend configuration associated with the one or more backend services is stored at S220. The backend configuration may include information usable to manage connections to the one or more backend services, including but not limited to IP address, authentication information, IP allowlists, and IP blocklists.

Figure 3:
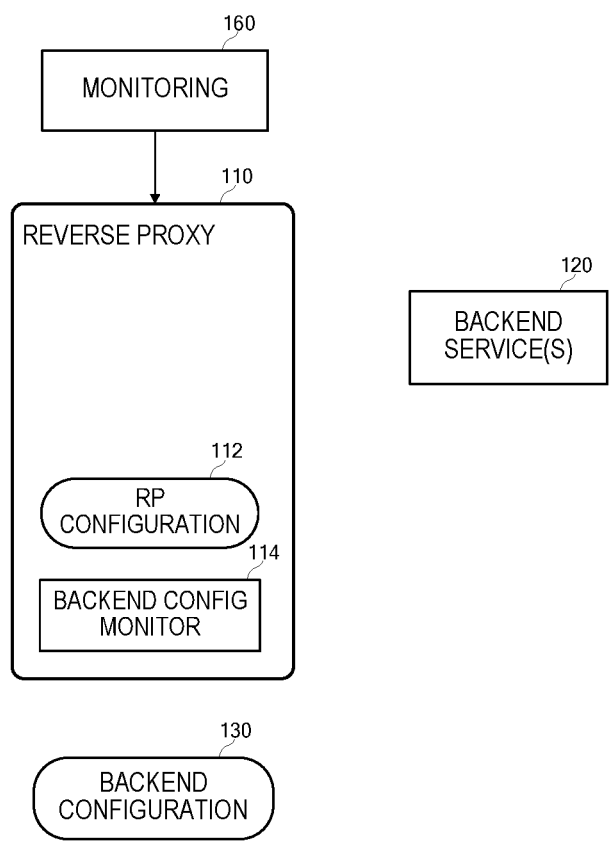
FIG. 3 illustrates testing of a reverse proxy configuration according to some embodiments.

FIG. 3 illustrates a testing landscape according to some embodiments. The testing landscape also includes backend service(s) 120 and stored backend configuration 130, both accessible to reverse proxy 110. Reverse proxy 110 includes backend configuration monitor 114 to detect changes to backend configuration 130.

Figure 4:
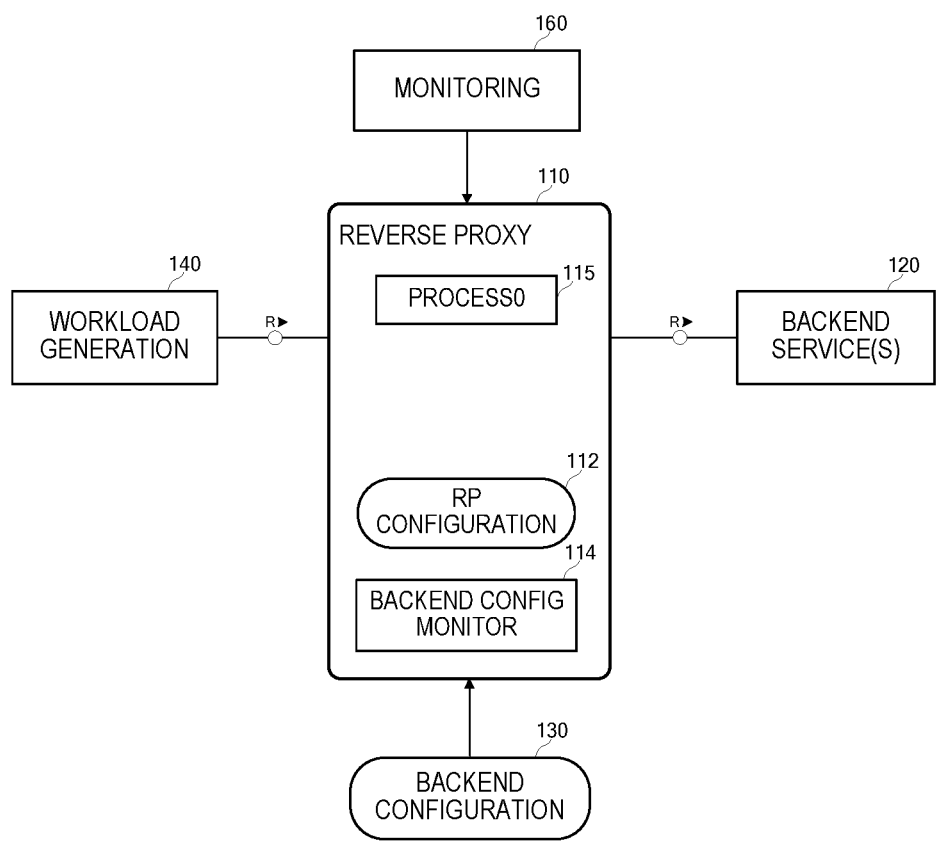
FIG. 4 illustrates testing of a reverse proxy configuration according to some embodiments.

A reverse proxy process is instantiated at S230 based on the current backend configuration. With reference to FIG. 4, reverse proxy 110 instantiates process0 115 at S230 and provides backend configuration 130 to process0 115 to establish and manage the connections to backend service(s) 120.

A request is received to connect to one of the backend services at S240. As shown in FIG. 4, workload generation component 140 may transmit a request (e.g., an HTTPS request) to access one of backend service(s) 120 at S240. The request is received by reverse proxy 110, which uses process0 115 at S250 to manage the connection between workload generation component 140 and the one of backend service(s) 120.

It is then determined at S260 whether the number of currently-instantiated processes equals a pre-defined threshold. The threshold may be set prior to execution of process 200 and may be based on an expected maximum number of simultaneously-executing reverse proxy processes during productive operation. In some embodiments, the threshold is 100.

Figure 5:
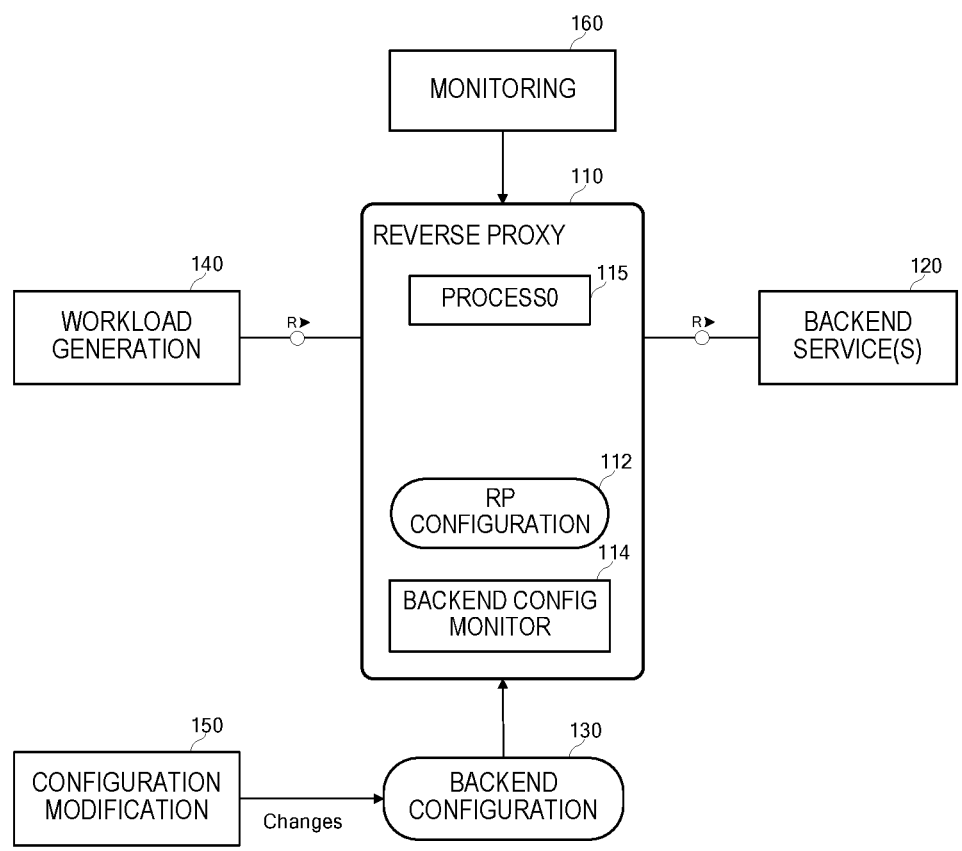
FIG. 5 illustrates testing of a reverse proxy configuration according to some embodiments.

Flow continues to S270 if the number of executing processes does not equal the threshold. The backend configuration is changed at S270. As described above, the change may include changes to an IP allowlist and/or an IP blocklist associated with one or more of backend service(s) 120, addition of a new backend service 120, and deletion of a backend service 120. FIG. 5 depicts configuration modification component 150 deploying such changes to backend configuration 130 at S270 according to some embodiments. According to some embodiments, configuration modification component 150 deploys the changes in response to instantiation of process0 115, or in response to transmission of the request which results in instantiation of process0 115.

Figure 6:
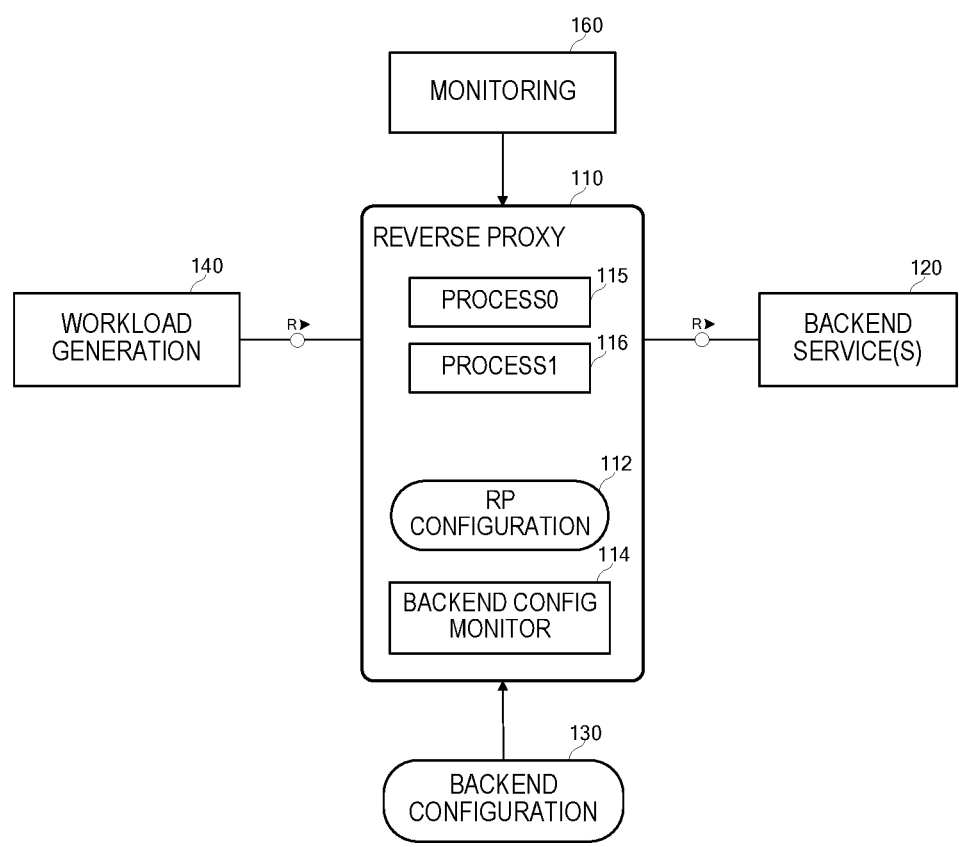
FIG. 6 illustrates testing of a reverse proxy configuration according to some embodiments.

The change to the backend configuration is detected at S280, for example by backend configuration monitor 114. In response, a new reverse proxy process is instantiated based on the changed backend configuration at S290. FIG. 6 illustrates instantiation of new process1 116 at S290. Process0 115 remains active because workload generation component 140 continues to maintain the connection managed by process0 115.

Next, at S240, another request is received at the reverse proxy to connect to one of the backend services. The backend service 120 specified in the request may be the same background service 120 of the prior request or a different background service 120. Workload generation component 140 may transmit the request in response to the prior change to the backend configuration at S270.

The new connection is managed at S250 by the most-recent reverse proxy process (i.e., process1 116) based on the changed backend configuration. Flow continues to S270 if it is again determined at S260 that the number of executing processes is not equal to the threshold. The backend configuration is changed again at S270, resulting in instantiation of another process (i.e., process2 117 of FIG. 1) at S290. Again, workload generation component 140 continues to maintain the connections managed by the existing processes (process0 115 and process1 116).

Flow continues in this manner, cycling between S240 and S290, until the number of instantiated processes equals the threshold. Then, at S295, the reverse proxy is monitored to evaluate its performance under the load of the instantiated processes. The monitoring may include acquisition of performance metrics associated with the reverse proxy. Monitoring may continue at S295 until sufficient data has been acquired. It should be noted that the reverse proxy may be monitored throughout process 200. In some embodiments, process 200 may terminate prior to an affirmative determination at S290 because the monitoring indicates unsatisfactory performance by the reverse proxy even before the number of instantiated processes has reached the threshold.

Figure 7:
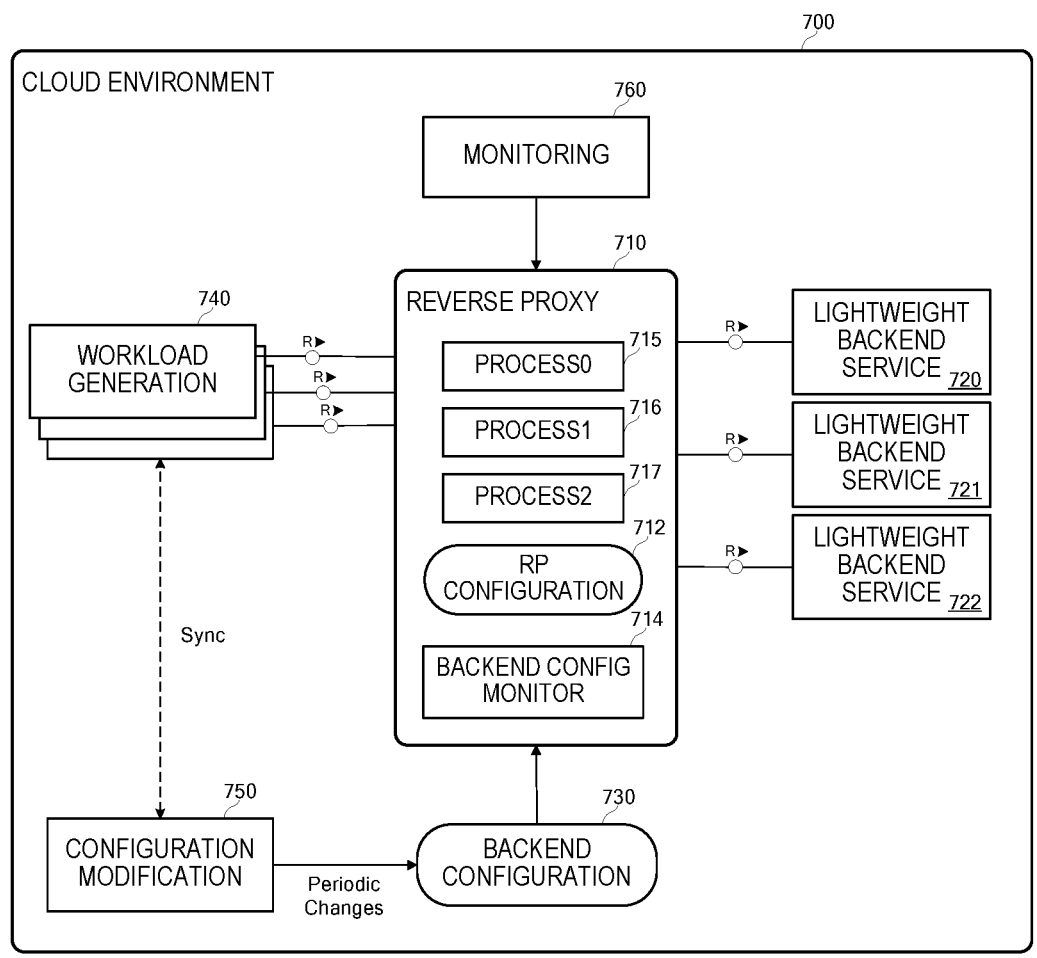
FIG. 7 illustrates a cloud environment including components for testing a reverse proxy configuration according to some embodiments.

FIG. 7 illustrates a landscape for testing a reverse proxy configuration according to some embodiments. The landscape includes cloud environment 700, which may comprise disparate cloud-based services, a single computer server, a cluster of servers, and any other combination that is or becomes known. In some embodiments, cloud environment 700 comprises a microservice-based cloud-native system utilizing a Kubernetes cluster. Kubernetes is an open-source system for automating deployment, scaling and management of containerized applications. Monitoring component 760 may therefore comprise Prometheus, a Kubernetes-compatible monitoring system which collects metrics for each service in the cluster and supports monitoring, processing and alerting applications.

Reverse proxy 710 may comprise an implementation of reverse proxy 110 and is shown simultaneously executing three processes 715-717 during testing of reverse proxy configuration 712 as described above. Lightweight backend services 720-722 may comprise implementations of backend service(s) 120. All of lightweight backend services 720-722 may comprise a same type of service (e.g., a dummy TCP endpoint) but embodiments are not limited thereto. Backend configuration 730 provides metadata used by processes 715-717 for establishing and managing connections with lightweight backend services 720-722. As described above, process2 717 manages connections with lightweight backend services 720-722 based on the current version of backend configuration 730, while process0 715 and process1 716 manage connections with lightweight backend services 720-722 based on respective prior versions of backend configuration 730.

Workload generation components 740 may comprise multiple instances of a component to request and maintain connections to lightweight backend services 720-722. According to some embodiments, a first one of workload generation components 740 requests a first connection which is managed by process0 115, a second one of workload generation components 740 requests a second connection which is managed by process1 116, and a third one of workload generation components 740 requests a third connection which is managed by process2 117.

According to some embodiments, the requests issued by workload generation components 740 are synchronized with periodic changes to backend configuration 730 made by configuration modification component 750. For example, according to some embodiments, configuration modification component 750 may operate in conjunction with workload generation components 740 to ensure that a backend service configuration is changed, a new reverse proxy process is instantiated based on the change, a connection request is received, the connection is managed by the new reverse proxy process, the backend service configuration is changed, and so on in sequence. In other words, workload generation components 740 may send a next connection request in response to a change to backend configuration 730, and configuration modification component 750 may change backend configuration 730 in response to the sending of a connection request.

Figure 8:
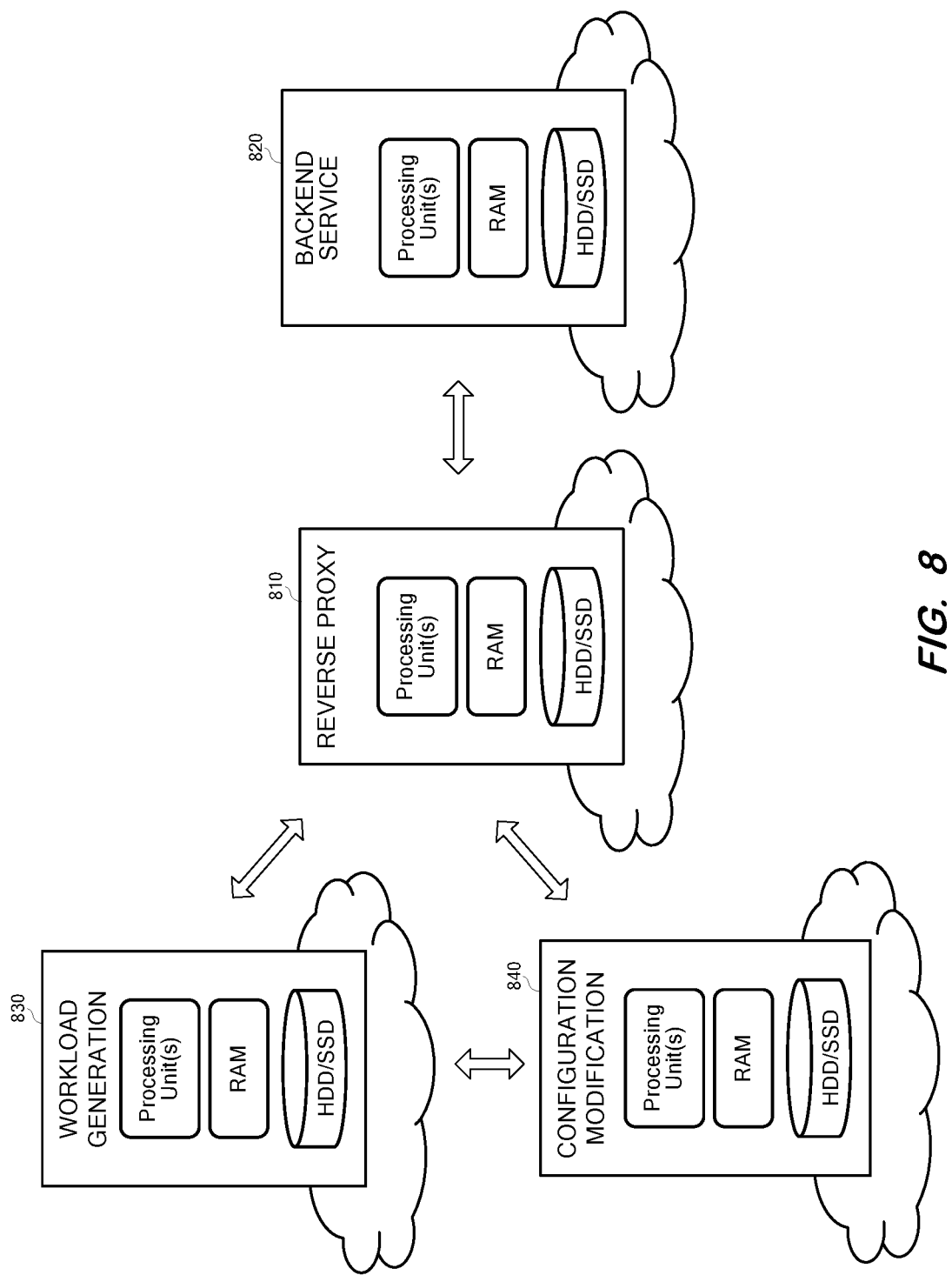
FIG. 8 is a block diagram of cloud-based virtual machines for testing a reverse proxy configuration according to some embodiments.

FIG. 8 illustrates components of a cloud environment according to some embodiments. The illustrated components may comprise cloud-based resources residing in one or more public clouds providing self-service and immediate provisioning, autoscaling, security, compliance and identity management features. In some embodiments, each component comprises one or more nodes of a Kubernetes cluster. Such nodes may support containerized applications which provide one or more services.

Reverse proxy 810 may manage connections to backend service 820 based on a reverse proxy configuration. Workload generation component 830 requests connections to backend service 820 and maintains the connections as described above. Configuration modification component 840 changes a backend configuration used by processes of reverse proxy to manage the connections to backend service 820. As described above, issuance of the requests by workload generation component 830 may be synchronized with changing of the backend configuration by configuration modification component 840 to result in instantiation of a desired number of simultaneously-executing processes within reverse proxy 810, where each process manages one long-running connection between workload generation component 830 and backend service 820.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
instantiating a first reverse proxy process based on a first service configuration associated with a first service;
transmitting a first request for a first connection to a first service;
using the first reverse proxy process to manage the first connection based on the first service configuration;
in response to the first request, changing the first service configuration to a second service configuration associated with the first service;
in response to the change of the first service configuration to the second service configuration, instantiating a second reverse proxy process based on the second service configuration;
transmitting a second request for a second connection to the first service; and
using the second reverse proxy process to manage the second connection in response to the second request,
wherein the first reverse proxy process and the second reverse proxy process execute simultaneously.

2. A method according to claim 1, further comprising:
determining that a number of simultaneously-executing reverse proxy processes equals a threshold; and
in response to the determination, stopping transmission of requests for connections.

3. A method according to claim 1, further comprising:
in response to the second request, changing the second service configuration to a third service configuration;
in response to the change of the second service configuration to the third service configuration, instantiating a third reverse proxy process based on the third service configuration,
transmitting a third request for a third connection to a third service; and
using the third reverse proxy process to manage the third connection,
wherein the first reverse proxy process, the second reverse proxy process, and the third reverse proxy process execute simultaneously.

4. A method according to claim 3, further comprising:
determining that a number of simultaneously-executing reverse proxy processes equals a threshold; and
in response to the determination, stopping transmission of requests for connections.

5. A method according to claim 3, further comprising:
monitoring performance of the reverse proxy processes;
determining that the performance is unsatisfactory; and
in response to the determination that the performance is unsatisfactory, stopping transmission of requests for connections.

6. A method according to claim 1, further comprising:
monitoring performance of the reverse proxy processes;
determining that the performance is unsatisfactory; and
in response to the determination that the performance is unsatisfactory, stopping transmission of requests for connections.

7. A computer-implemented method comprising:
instantiating a first reverse proxy process based on a first service configuration associated with a first service;
transmitting a first request for a first connection to a first service;
using the first reverse proxy process to manage the first connection based on the first service configuration;
changing the first service configuration to a second service configuration associated with the first service;
in response to the change of the first service configuration to the second service configuration, instantiating a second reverse proxy process based on the second service configuration;
in response to the change of the first service configuration to the second service configuration, transmitting a second request for a second connection to the first service; and
using the second reverse proxy process to manage the second connection in response to the second request,
wherein the first reverse proxy process and the second reverse proxy process execute simultaneously.

8. A method according to claim 7, further comprising:
determining that a number of simultaneously-executing reverse proxy processes equals a threshold; and
in response to the determination, stopping transmission of requests for connections.

9. A method according to claim 7, further comprising:
changing the second service configuration to a third service configuration;
in response to the change of the second service configuration to the third service configuration, instantiating a third reverse proxy process based on the third service configuration,
in response to the change of the second service configuration to the third service configuration, transmitting a third request for a third connection to a third service; and
using the third reverse proxy process to manage the third connection,
wherein the first reverse proxy process, the second reverse proxy process, and the third reverse proxy process execute simultaneously.

10. A method according to claim 9, further comprising:
determining that a number of simultaneously-executing reverse proxy processes equals a threshold; and
in response to the determination, stopping transmission of requests for connections.

11. A method according to claim 9, further comprising:
monitoring performance of the reverse proxy processes;
determining that the performance is unsatisfactory; and
in response to the determination that the performance is unsatisfactory, stopping transmission of requests for connections.

12. A method according to claim 7, further comprising:
monitoring performance of the reverse proxy processes;
determining that the performance is unsatisfactory; and in response to the determination that the performance is unsatisfactory, stopping transmission of requests for connections.

13. A non-transitory computer-readable medium storing processor-executable program code, the program code executable to:
- instantiate a first reverse proxy process based on a first service configuration associated with a first service;
- transmit a first request for a first connection to a first service;
- use the first reverse proxy process to manage the first connection based on the first service configuration;
- in response to the first request, change the first service configuration to a second service configuration associated with the first service;
- in response to the change of the first service configuration to the second service configuration, instantiate a second reverse proxy process based on the second service configuration;
- in response to the change of the first service configuration to the second service configuration, transmit a second request for a second connection to the first service; and
- use the second reverse proxy process to manage the second connection in response to the second request,
- wherein the first reverse proxy process and the second reverse proxy process execute simultaneously.

14. A medium according to claim 13, the program code executable to:
- determine that a number of simultaneously-executing reverse proxy processes equals a threshold; and
- in response to the determination, stop transmission of requests for connections.

15. A medium according to claim 13, the program code executable to:
- in response to the second request, change the second service configuration to a third service configuration;
- in response to the change of the second service configuration to the third service configuration, instantiating a third reverse proxy process based on the third service configuration,
- in response to the change of the second service configuration to the third service configuration, transmit a third request for a third connection to a third service; and
- use the third reverse proxy process to manage the third connection,
- wherein the first reverse proxy process, the second reverse proxy process, and the third reverse proxy process execute simultaneously.

16. A medium according to claim 15, the program code executable to:
- determine that a number of simultaneously-executing reverse proxy processes equals a threshold; and
- in response to the determination, stop transmission of requests for connections.

17. A medium according to claim 15, the program code executable to:
- monitor performance of the reverse proxy processes;
- determine that the performance is unsatisfactory; and
- in response to the determination that the performance is unsatisfactory, stop transmission of requests for connections.

18. A medium according to claim 13, the program code executable to:
- monitor performance of the reverse proxy processes;
- determine that the performance is unsatisfactory; and
- in response to the determination that the performance is unsatisfactory, stop transmission of requests for connections.

* * * * *